United States Patent [19]

Yasuhara

[11] 4,417,561
[45] Nov. 29, 1983

[54] METHOD AND APPARATUS FOR AUTOMATICALLY CHANGING AND DISPOSING OF USED ENGINE OIL

[75] Inventor: Seishi Yasuhara, Yokosuka, Japan

[73] Assignee: Nissan Motor Co., Ltd., Yokohama, Japan

[21] Appl. No.: 153,666

[22] Filed: May 27, 1980

[30] Foreign Application Priority Data

May 26, 1979 [JP] Japan .................. 54-64586
Jul. 11, 1979 [JP] Japan .................. 54-86830

[51] Int. Cl.³ .......................................... F02B 13/00
[52] U.S. Cl. ........................... 123/575; 123/196 R; 123/196 S; 123/510; 184/103 R; 184/6.4
[58] Field of Search .............. 123/575, 196 R, 198, 123/73 AD, 196 S, 510, 515; 184/6.24, 6.4, 1.5, 53, 65, 103 A, 103 R

[56] References Cited

U.S. PATENT DOCUMENTS

| | | | |
|---|---|---|---|
| 2,792,912 | 5/1957 | Kangas | 184/103 A |
| 3,282,380 | 11/1966 | Burrell et al. | 184/1.5 |
| 3,447,636 | 6/1969 | Bonfilio | 184/1.5 |
| 3,447,636 | 6/1969 | Bonfilio | 184/1.5 |
| 3,929,645 | 12/1975 | Bugelski et al. | 184/1.5 |
| 4,091,895 | 5/1978 | Lang | 184/103 R |
| 4,095,571 | 6/1978 | Fleetwood et al. | 123/575 |

FOREIGN PATENT DOCUMENTS

| | | |
|---|---|---|
| 2736153 | 2/1978 | Fed. Rep. of Germany. |
| 52-24637 | 2/1977 | Japan .................. 184/1.5 |
| 720222 | 12/1954 | United Kingdom. |

*Primary Examiner*—William A. Cuchlinski, Jr.
*Assistant Examiner*—E. Rollins Cross
*Attorney, Agent, or Firm*—Thompson, Birch, Gauthier & Samuels

[57] ABSTRACT

A method and apparatus for automatically changing and disposing of used engine oil for a diesel engine. An oil conduct means is provided which conducts a portion of the engine oil circulating through the lubrication system of a diesel engine to the fuel system to be mixed with the fuel. The oil/fuel mixture is burned in the combustion chamber. An oil tank is provided outside of the lubricant system. An oil supply means is provided which automatically supplies oil from the oil tank to the lubricant system when the amount of oil within the lubricant system decreases.

11 Claims, 20 Drawing Figures

METHOD AND APPARATUS FOR AUTOMATICALLY CHANGING AND DISPOSING OF USED ENGINE OIL

BACKGROUND OF THE INVENTION

The present invention relates to a system for automatically changing oil and disposing of used oil for a diesel or a two-stroke internal combustion engine.

Engine oils, used as lubricants, become degraded after prolonged use and are no longer effective. Thus, it is necessary to change oil at regular intervals. However, the task of changing oil is both time consuming and costly. Sometimes, it is entirely forgotten. It is also necessary to check the operating oil level at regular intervals and to add oil when necessary. This too is a troublesome task which is often forgotten. Finally, used oil must be treated, and this is also a costly process.

SUMMARY OF THE INVENTION

The present invention comprises, in a diesel or a two-stroke internal combustion engine including a lubricant system having an oil pan and a fuel system having a fuel tank, a system for automatically changing oil and disposing of used oil comprising: oil conduct means for conducting a portion of the engine oil within the lubricant system toward the fuel system to be mixed with fuel therein; an oil tank disposed outside of the lubricant system to store new engine oil; and oil supply means for supplying oil from said oil tank to the lubricant system by detecting engine oil within the lubricant system.

Accordingly, an object of the present invention is to provide a system which is free from the above-mentioned problems and which automatically changes oil and disposes of used oil.

BRIEF DESCRIPTION OF THE DRAWINGS

The features and advantages of the system for automatically changing oil and disposing of used oil according to the present invention will be more clearly appreciated from the following description taken in conjunction with the accompanying drawings in which like reference numerals designate corresponding elements, and in which.

DETAILED DESCRIPTION OF THE INVENTION

Figure 1:
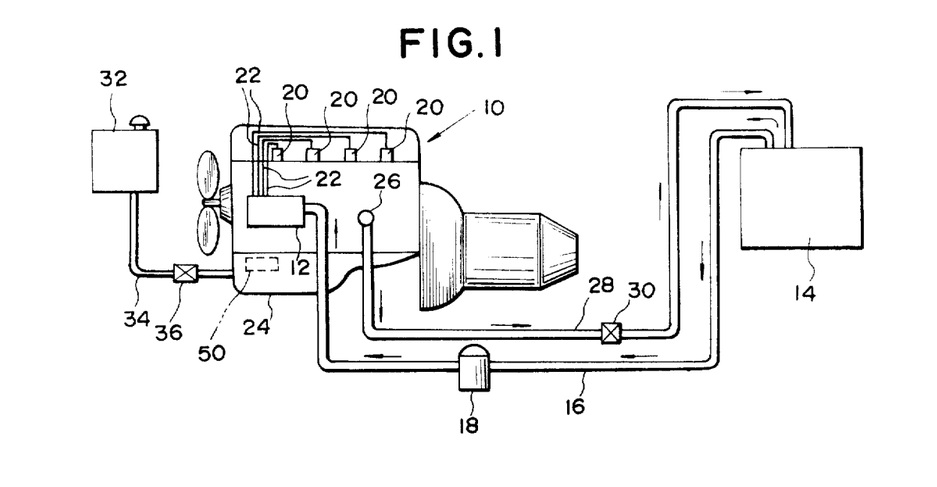
FIG. 1 is a diagrammatical view of a preferred embodiment of the system for automatically changing oil and disposing of used oil according to the present invention.

Referring to the accompanying drawings and particularly to FIG. 1 there is shown an internal combustion engine 10 which operates on a fuel/oil mixture, for example a diesel or a two-stroke internal combustion engine. Internal combustion engine 10 includes a fuel system which has a fuel injection pump 12, a fuel tank 14, a fuel supply conduit 16, a fuel filter 18, fuel injectors 20 and high pressure fuel passages 22. The fuel supply conduit 16 leads from the fuel tank 14 to the fuel injection pump 12 so as to conduct fuel from the fuel tank 14 to the fuel injection pump 12. Fuel is filtered by the fuel filter 18 as it passes therethrough. The fuel injection pump 12 delivers fuel to the fuel injectors 20 via respective high pressure fuel pipes 22.

The internal combustion engine also includes a lubricant system which has an oil pan 24 wherein engine oil is distributed to various portions of the engine by an oil pump, not shown, and then returns to the oil pan 24. The lubricant system of the present invention communicates via a bypass port 26 with the engine lubricating system downstream of the oil pump.

Oil conduct means includes an oil conduct conduit 28 having one end connected to the lubricant system via the bypass port 26 and leading to the fuel tank 14, and an electromagnetic valve 30 provided in the oil conduct conduit 28 to regulate the flow of used engine oil within the lubricant system to the fuel system to be mixed with fuel.

Oil supply means includes an oil supply conduit 34 connecting an oil tank 34 to the oil pan 24, and an electromagnetic valve 36 provided in the oil supply conduit 34 for regulating the introduction of new engine oil into the oil pan. Oil is supplied from the oil tank 32 to the oil pan 234 by gravity flow because the oil tank 32 is arranged at a level higher than that of the oil pan 24.

Figure 2:
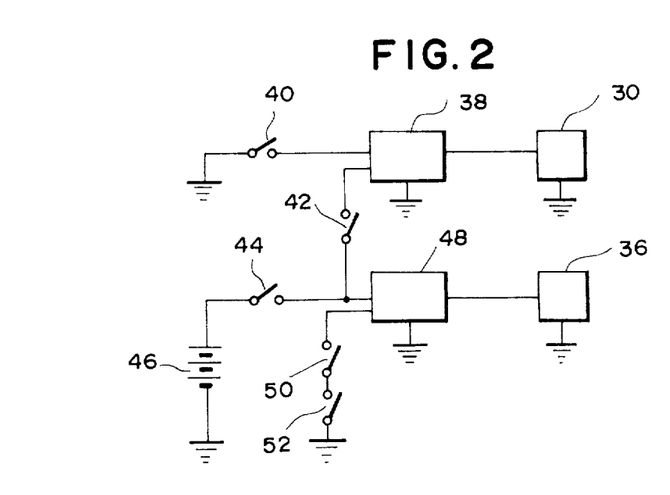
FIG. 2 is a block diagram of a control circuit used in the system of FIG. 1.

Referring to FIG. 2 in addition to FIG. 1, control of the electromagnetic valves 30 and 36 will be hereinafter described. The electromagnetic valve 30 is normally closed. When the electromagnetic valve 30 is closed, no oil is permitted to flow through the oil conduct conduit 28. When the electromagnetic valve 30 is energized, oil is permitted to pass through the oil conduct conduit 28, so that the oil conduct means is in its operative state. As shown in FIG. 2, a timer 38 is provided which remains on for a predetermined time duration every time an odometer switch 40 is closed. The timer 38 is electrically connected via a safety switch 42 and an ignition switch 44 with a battery 46. The safety switch 42 is normally closed and is opened when necessary, as when the oil tank 42 is near empty or when for any reason it is preferable not to withdraw used oil from the engine, to prevent oil from flowing out of the lubricant system. The odometer switch 40 is closed each time the automobile has travelled a predetermined distance. As will be understood from FIG. 2, the electromagnetic valve 30 is electrically connected with the timer 38, safety switch 42, ignition switch 44 and battery 46 such that it receives current from the battery 46 thereby.

The electromagnetic valve 36 is normally closed. When the electromagnetic valve 36 is closed, no new oil is permitted to flow through the oil supply conduit 34. When the electromagnetic valve 30 is energized, new oil is permitted to pass through the oil supply conduit 34, so that the oil supply means is in operative state. As shown in FIG. 2, a timer 48 is provided which remains on for a predetermined time duration when both an oil level switch 50 and an oil pressure switch 52 are closed. The timer 48 is electrically connected via the ignition switch 44 with the battery 46. The oil level switch 50 is normally open, but is closed when the oil level within the oil pan 24 drops below a predetermined level. The oil pressure switch 52 is normally open, but is closed when oil pressure within the lubricant system drops below a predetermined pressure. As will be understood from FIG. 2, the electromagnetic valve 36 is electrically connected with the timer 48, engine switch 44, and battery 46 such that it receives current thereby.

Figure 3A:
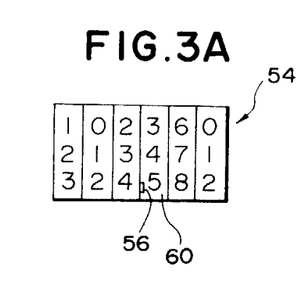
FIGS. 3A and 3B are views of an odometer switch used in the control circuit of FIG. 2, FIG. 3A showing the figure wheels of an odometer provided with a switch contact and FIG. 3B showing the figure wheel provided with the switch contact and a stationary mating contact.
Figure 3B:
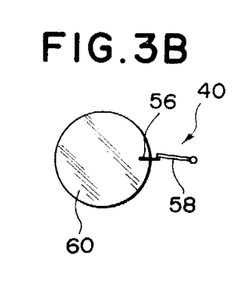

Referring to FIGS. 3A and 3B, the construction of the odometer switch 40 is described. As shown, the odometer switch 40 is associated with an odometer 54 including a plurality of figure wheels. A movable contact piece 56 of the odometer switch 40 is fixed to a figure wheel 60 that indicates the order of 10 km by being embedded to a peripheral surface of the figure wheel 60. The odometer switch 40 includes a stationary contact piece 58 which is fixed such that the movable contact piece 56 comes into contact with the stationary contact 58 once upon each rotation of the figure wheel 60. It will now be understood that the odometer switch 40 closes each time the automobile has travelled through 100 km.

Operation of the preferred embodiment illustrated in FIGS. 1 to 3B will be described hereinafter. It is assumed that the ignition switch 44 and safety switch 42 are closed. When the odometer switch 40 closes when the automobile has travelled through 100 km, the timer 38 turns on for the predetermined time duration. During this time duration, the electromagnetic valve 30 is open, thus permitting engine oil to pass through the conduct conduit 28 to the fuel tank 14. The amount of engine oil passing through the conduct conduit 28 is proportional to the predetermined time duration for which the timer 38 is on. The used engine oil is mixed with fuel within the fuel tank 14 and this mixture of engine oil and fuel is conveyed through the fuel supply conduit 16 by means of the fuel injection pump 12 toward the fuel injectors 20 to be injected into the combustion chambers where the mixture of engine oil and fuel is burned.

When the oil level within the oil pan 24 drops below a predetermined level as a result of oil extraction from the lubricant system, or for any other reason, the oil level switch 50 within the oil pan 24 closes. The oil pressure switch 52 remains open when the engine is operating because oil pressure is high, so that the timer 48 remains off as long as the engine is operating. However, if the oil pressure switch 52 closes when the engine is idling, before the engine is started, or otherwise when the engine oil pressure drops below the predetermined minimum pressure, the timer 48 turns on for a predetermined time duration, thus energizing the electromagnetic valve 36, causing oil stored within the oil tank 32 to pass through the oil supply conduit 34 to the oil pan 24. As a result, the oil level within the oil pan 24 is maintained at an appropriate level. The amount of oil passing through the oil supply conduit 34 is proportional to the predetermined time duration for which the timer 48 is on.

The inclusion of the oil pressure switch 52 is to prevent overfilling the oil pan 24, which might otherwise occur when the oil level switch closes in response to a temporary drop in the oil level below the predetermined level due to engine vibration or delay in restoring the initial level, immediately after the engine has been started, because of high viscosity of the oil. Therefore, new oil will be added to the oil pan only when the oil level is low and when the oil pressure is below a predetermined minimum.

The time duration for which the timer 48 is on determines the amount of new engine oil supplied to the oil pan. This time duration should be set so that even if an erroneous command occurs, oil level will not increase excessively.

It will now be understood that since a small amount of engine oil is extracted from the lubricant system and in lieu thereof a small amount of new engine oil is supplied, the conventional oil change has become unnecessary and the engine oil within the lubricant system is constantly being changed in order to maintain a constant degree of cleanliness. Since that portion of engine oil which has been extracted from the lubricant system is burned together with the fuel, the conventional problem of changing and disposing of used engine oil has been eliminated.

In deciding upon what amount of engine oil should be extracted from the lubricant system, in the case of a diesel engine having a 5 liter oil capacity and requiring a change over 5,000 km, the amount of oil to be extracted every 100 km drive is 100 cc. Assusming that the fuel consumption rate is 10 km/liter, it can be considered that 100 cc of engine oil is added to 10 litter of fuel. It follows that fuel-to-oil ratio is 100:1. This ratio is far lower than the fuel-to-oil ratio of a mixture used in two-cycle internal combustion engines. Thus, there is no problem. Although the addition of oil causes insufficient fuel atomization, combustion will not be impaired in the case of diesel engines.

Of course it is theoretically possible to extract 1 cc of engine oil from the lubricant system, but this kind of fine control is difficult and not practical.

The function of the safety switch 42 is to prevent extraction of oil from the lubricant system in the event the oil tank 32 is near empty or it is otherwise preferable not to withdraw used oil from the engine. The safety switch 42 is manually operable.

Preferably, the oil tank 12 is made of a transparent or semi-transparent material for ease of inspection.

Although, in the embodiment thus far described, engine oil is extracted via the bypass port 26, it is possible to extract engine oil from the oil pan 24 if an electric pump replaces the electromagnetic valve 30. In this case, the electric pump should be of the closed-when-not-in-operation type.

Although, in this embodiment, the oil tank 32 is arranged at a level higher than the oil pan 24 so as to utilize gravity flow, it is also possible to replace the electromagnetic valve 36 with an electric pump. It is also possible to connect the oil supply conduit 34 to the suction side of the engine oil pump, not shown, thus eliminating the electromagnetic valve 36.

It is, of course, possible that the time duration for which the timer 38 is on and/or the time duration for which the timer 48 is on be variable in order to effect variable control of engine oil extraction and addition.

Figure 4:
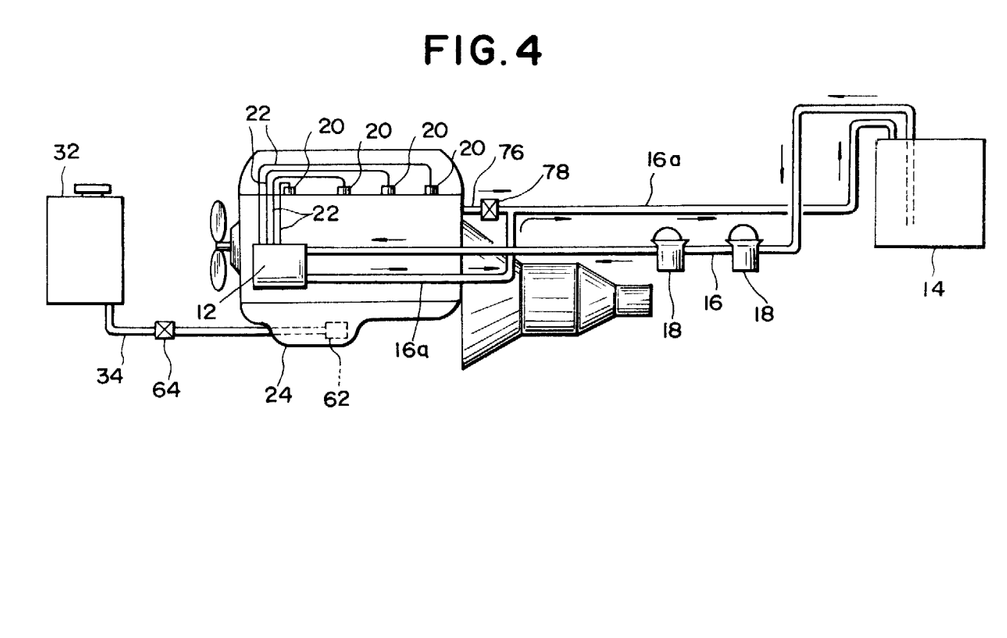
FIG. 4 is a view similar to FIG. 1 showing a second embodiment of the system according to the present invention.

Referring to FIGS. 4 to 8, a second embodiment will be described hereinafter. Referring to FIG. 4, the second embodiment of a system according to the present invention is similar to the first embodiment illustrated in FIG. 1, but differs in the following respects.

In the second embodiment, oil supply means includes, instead of the electromagnetic valve 36, a float valve 62 and a valve of an open close type 64. As illustrated in FIG. 4, an oil supply conduit 34 leads to an oil pan 24 and the open close type valve 64 is provided therein. This valve 64 is operative in cooperation with the engine ignition switch and with an alarm buzzer such that the valve 64 closes the oil supply conduit 34 when the engine ignition switch is open (off) or when the alarm buzzer is actuated.

Figure 5A:
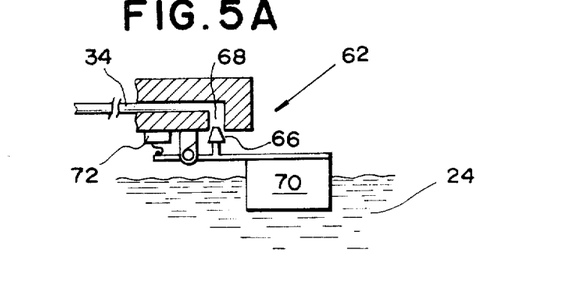
FIG. 5A is a diagrammatic sectional view of a float valve used in the system of FIG. 4.

As best illustrated in FIG. 5A, the oil supply conduit 34 terminates at a valve port 68 of the float valve 62. The construction of the float valve 62 includes a float 70 attached to a valve element 66 which is adapted to close the port 68 in response to a predetermined liquid level in the oil pan. As the oil level within the oil pan 24 increases above the predetermined level, the float 70 moves upward to lift the valve element 66 to close the port 68, while a drop in the oil level below the predetermined level causes the float 70 to move downward, thus opening the port. Preferrably, the float valve 62 is disposed in the central portion of the oil pan 24.

Figure 5B:
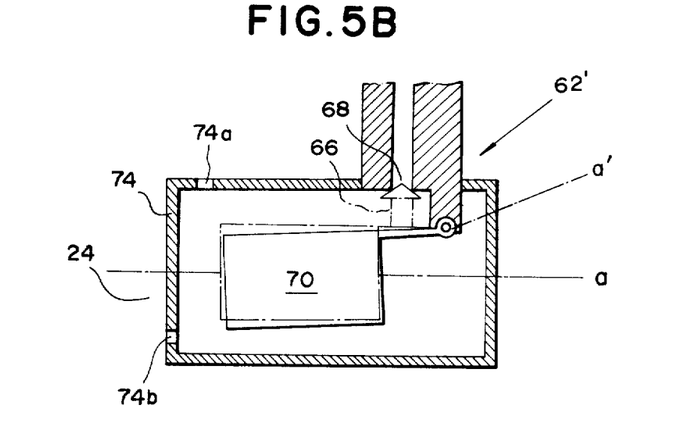
FIG. 5B is a diagrammatic vertical sectional view of a modification of the float valve of FIG. 5A.
Figure 5C:
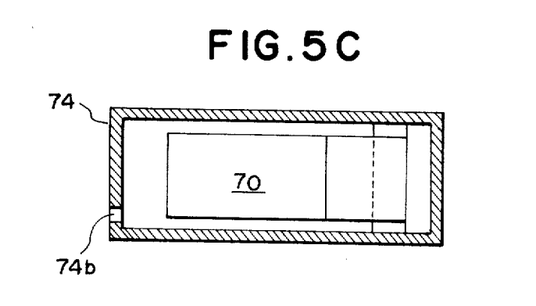
FIG. 5C is a horizontal sectional view of the float valve illustrated in FIG. 5B.

If the float is too sensitive to fluctuation of the oil level within the oil pan 24, it is preferrable to enclose the float in a frame as shown in FIGS. 5B and 5C. The modified float valve 62' shown therein differs from the float valve 62 only in the provision of an enclosing frame 74. The enclosing frame 74 is formed with at least one air bleed hole 74a at the top wall thereof and at least one hole 74b within an area which is normally immersed in oil within the oil pan 24. The enclosing frame 74 functions as a baffle to negate the effect of sudden, temporary fluctuations in oil level within the oil pan 24, resulting from vehicle motion, increased oil viscosity, etc., by restricting the flow of oil between the oil pan and within the enclosing frame through the hole 74b. Thus, undesirable opening of the modified float valve 62' can be prevented. It will therefore be understood that the oil level within the oil pan 24 can be maintained at the predetermined level with more precision.

Figure 6A:
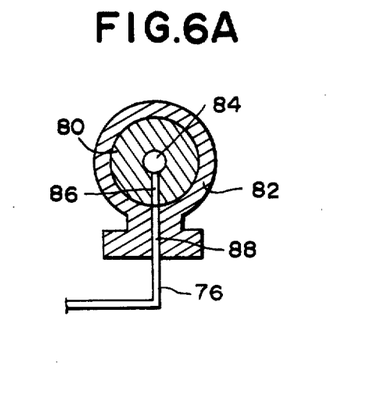
FIG. 6A is a sectional view taken through line V1A—V1A of FIG. 6B illustrating a journal portion wherein a cam shaft is rotatably supported by a bracket, illustrating an arrangement whereby a portion of engine oil is allowed to enter an oil conduct conduit that leads to a fuel system.
Figure 6B:
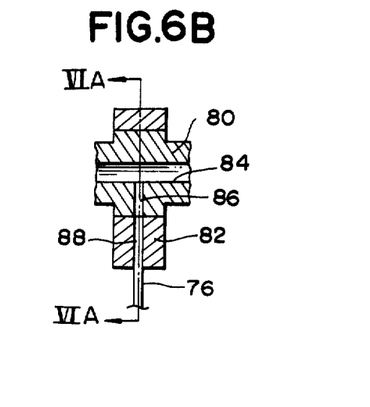
FIG. 6B is a longitudinal section of the journal portion illustrated in FIG. 6A.
Figure 7A:
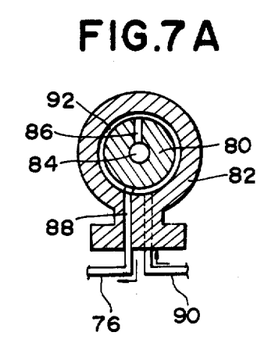
FIG. 7A is a cross sectional view taken through ine V11B—V11B of FIG. 7B illustrating a journal portion similar to FIG. 6A but illustrating another arrangement wherein a portion of engine oil is allowed to enter a conduct conduit that leads to a fuel system.
Figure 7B:
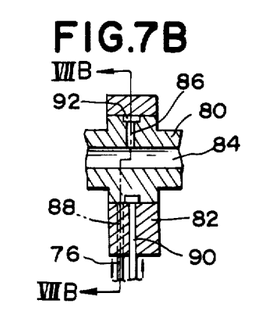
FIG. 7B is a sectional view of the journal portion illustrated in FIG. 7B.
Figure 7C:
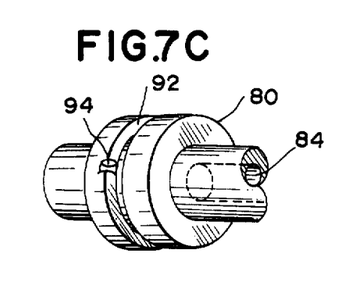
FIG. 7C is a perspective view of the journal portion illustrated in FIG. 7A.

The system illustrated in FIG. 4 is additionally different from the previously described system illustrated in FIG. 1 in that the oil conduct means includes mechanical means as illustrated in FIGS. 6A and 6B or mechanical means as illustrated in FIGS. 7A, 7B and 7C for the purpose of controlling the amount of oil extracted from the lubricant system, thus obviating the electromagnetic valve 30 and its associated control circuit. Another difference resides in the manner of connecting the oil conduct conduit. An oil conduct conduit 76 leading from the lubricant system is connected to a fuel return conduit or line 16a of a fuel system. The fuel return conduit 16a leads from a fuel injection pump 12 to a fuel tank 14 and functions to convey fuel from the fuel injection pump 12 back to the fuel tank 14. Provided in the oil conduct conduit 76 is a valve 78 of an open close type which is closed to prevent extraction of oil when the engine is not operating or when the alarm buzzer is actuated. The mechanical means for metering an amount of oil to be extracted from the lubricant system will be described hereinafter in connection with FIGS. 6A and 6B and with FIGS. 7A, 7B and 7C.

Referring to FIGS. 6A and 6B, the oil conduct conduit 76 leads to a journal portion of a cam shaft 80 rotatably supported by a bracket 82. The cam shaft 80 is formed with an oil gallery 84 and a passage 86 extending radially from the oil gallery 84. Formed in the bracket 82 is an oil passage 88 having one end connected to the oil conduct conduit 76. The radial oil passage 86 and oil passage 88 are aligned with each other such that they communicate once in every rotation of the cam shaft 80.

With the mechanical metering means illustrated in FIGS. 6A and 6B, once in every rotation when the cam shaft 80 comes to an angular position where the radial oil passage 86 communicates with the oil bracket passage 88, a portion of oil within the oil gallery 84 is pumped into the oil conduct conduit 76. The amount of oil flowing out of the oil gallery 84 is determined by the time duration for which the radial oil passage 86 communicates with the oil passage 88, the cross sectional area of the radial oil passage 86 and the oil pressure. Therefore, minute adjustment of the amount of oil flowing out of the lubricant system can be effected easily in a relatively accurately manner. The radial oil passage 86 also functions to supply oil to the mating journal surfaces between the cam shaft 80 and bracket 82.

Another form of mechanical metering means will be described in connection with FIGS. 7A, 7B and 7C. Referring to FIGS. 7A and 7B, there is shown a portion of a journal where oil is supplied to an oil gallery 84 of a cam shaft 80 via an oil supply conduit 90, a peripheral annular groove 92 and a radial oil passage 86. In order to extract oil, an oil passage 88 formed in a bracket 82 is arranged to mate with a cutout 94 (see FIG. 7C) with which the peripheral groove is formed such that the cutout 94 communicates with the oil passage 88 once in every rotation of the cam shaft 80. With this construction, a similar effect as that provided by the construction illustrated in FIGS. 6A and 6B is provided.

The amount of oil withdrawn from the lubricating system via the mechanical metering means as illustrated in FIGS. 6A and 6B or in FIGS. 7A, 7B and 7C should be adjusted such that a certain degree of cleanliness of oil within the lubricant system is maintained.

In the system thus far described in connection with FIGS. 4 to 7C, oil, although very small in amount, is continuously supplied to the fuel tank 14 while the engine is operating, and the oil level within the oil pan 24 is maintained at an appropriate level by the float valve 62 regulating the amount of new oil being introduced to the oil pan 24 from the oil tank 32. The cross sectional area of the oil supply conduit 34 should preferably be small within a range from 1 mm to 2 mm in diameter in order to prevent an excessive supply of oil in case a rapid change in oil level takes place momentarily within the oil pan 24.

Figure 8:
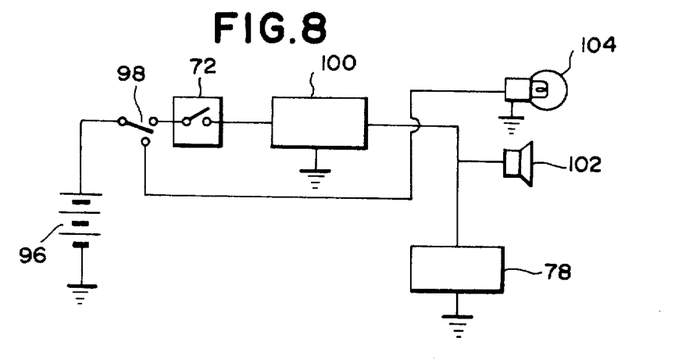
FIG. 8 is a block diagram illustrating a fail-safe and alarming circuit to cause the system of FIG. 4 to stop conducting a portion of engine oil toward the fuel system from the lubricant system.

Referring to FIG. 8, there is shown a circuit diagram of an electrical system which prevents the lubricating system from evacuating the oil pan without replacing the old oil with new oil. For example, in the event that it becomes impossible to supply a sufficient amount of oil to the lubricant system due to the shortage of oil within the oil tank 32, it becomes necessary to stop withdrawing oil from the lubricant system. To accomplish this, the float valve 62 is provided with a limit switch 72 (see FIG. 5A also) to detect an excessive drop in the oil level within the oil pan 24. The limit switch 72 is connected with a battery 96 via a manually operated switch 98 that is normally open. A timer 100 is connected with the limit switch 72, an alarm buzzer 102 and the valve 78 such that when the limit switch remains closed for a predetermined time period (e.g. 10 seconds), the timer is triggered to provide an output signal to the alarm buzzer 102 and the valve 78. The alaram buzzer 102 produces an alarm sound upon receiving the output signal from the timer 100. The valve 78 is actuated to close the oil conduct conduit 76 (see FIG. 4) to stop the withdrawal of oil from the lubricant system. It will now be noted that the generation of the output signal by the timer 100 is delayed from the instant the limit switch 72 is closed. This delay is provided for preventing the actuation of alarm buzzer 102 and the valve 78 in response to temporary changes in oil level within the oil pan 24. When the alarm buzzer 102 starts to produce an alarm sound and the driver has recognized that his attention is needed, he may operate the manual switch 98 from position establishing the electrical connection between the battery 96 and the limit switch 72 to an electrical connection between the battery 96 and an alarm lamp 104. Thus, the annoying alarm sound is replaced with the alarm lamp 104 to constantly remind the driver that the oil level in the oil pan is low.

It should be understood that with the system which has been described in connection with FIGS. 4 to 8, a certain degree of cleanliness of oil within the lubricant system can be maintained within an allowable range in a less expensive manner, with a very simple construction and with a high reliability.

Referring to FIGS. 9 to 14, a third embodiment will now be described. This embodiment is substantially similar to the first embodiment illustrated in FIGS. 1 to 3B, but incorporates modified oil conduct means.

Figure 10:
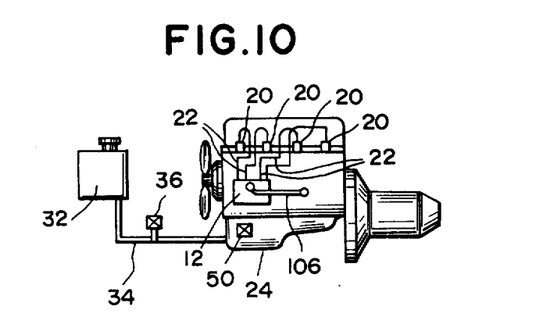
FIG. 10 is a view similar to FIG. 1 illustrating a third embodiment of the system for automatically changing oil and disposing of used oil according to the present invention.
Figure 11:
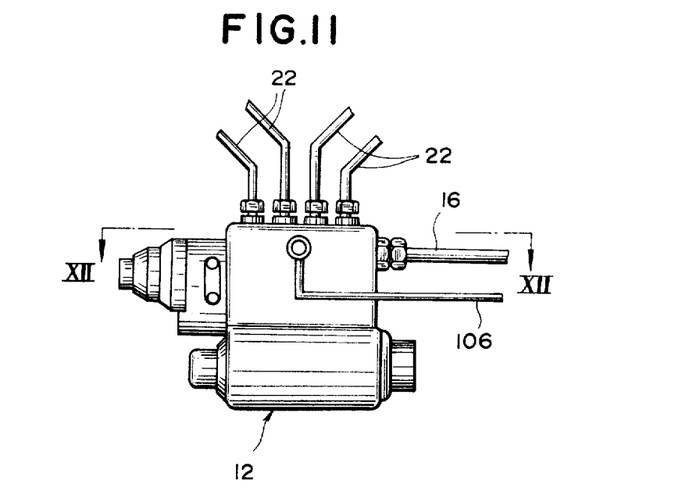
FIG. 11 is an enlarged fragmentary view of FIG. 10.
Figure 12:
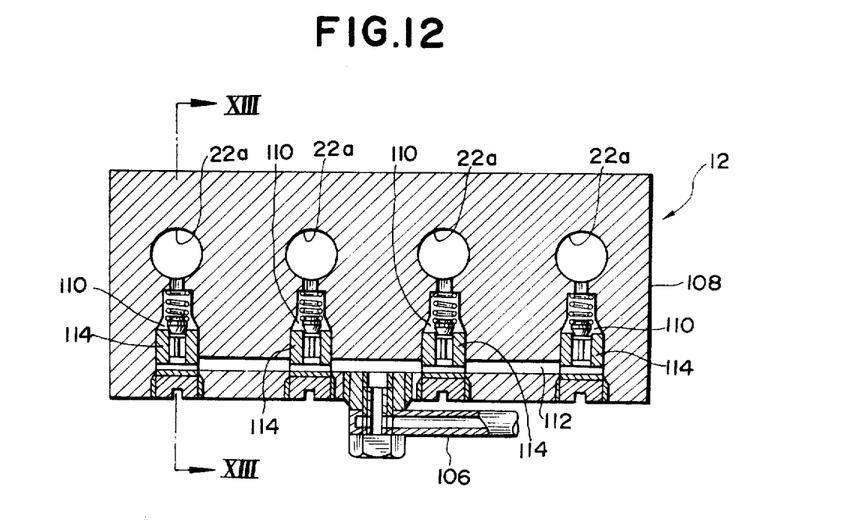
FIG. 12 is a sectional view taken through line X11—X11 of FIG. 11.
Figure 13:
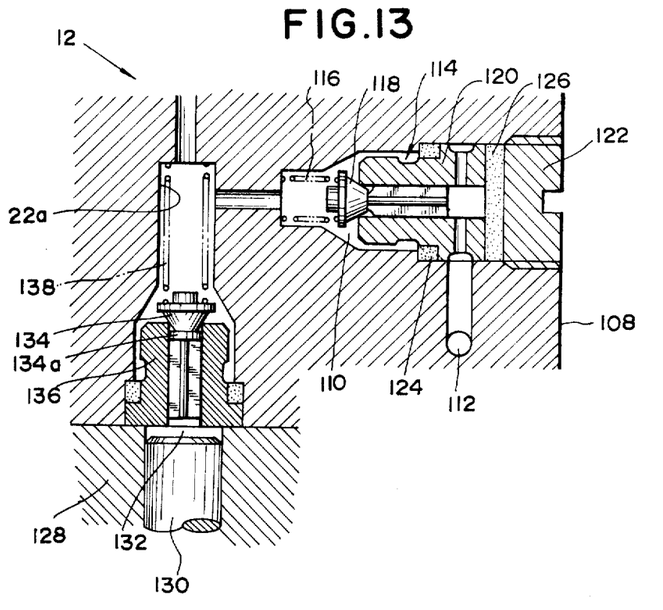
FIG. 13 is a sectional view taken through line X111—X111 of FIG. 12.
Figure 14:
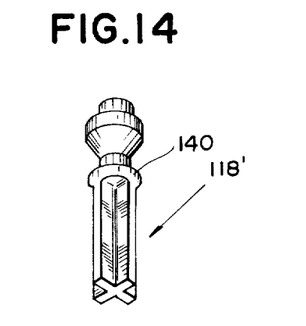
FIG. 14 is a pictorial view of a valve element of a check valve used in the embodiment of FIGS. 12 and 13.

Referring to FIGS. 10, 11 and 12, the oil conduct means in this embodiment includes an oil conduct conduit 106 that leads from a main gallery of a lubricant system to a fuel injection pump 12. As best shown in FIG. 12, the fuel injection pump 12 includes a body 108 formed with a plurality of high pressure fuel passages 22a connecting with high pressure fuel pipes 22, respectively, (see FIGS. 10 and 11 also) which in turn, communicate with fuel injectors 20, respectively. The body 108 is also formed with a plurality of connecting passages 110 each of which connects one of the high pressure fuel passages 22a to a common passage 112 communicating with the oil conduct conduit 106. Within each of the connecting passages 110, a check valve 114 is provided to permit one-way flow in a direction toward the corresponding high pressure fuel passage 22a. As best shown in FIG. 13, each check valve 114 includes a spring 116 which biases a valve element 118 toward a valve seat formed on a valve body 120. The valve body 120 is fixed in the illustrated position by means of a plug 122. Interposed between the valve body 120 of the check valve 114 and the valve body 108 of the fuel injection pump 12 is a seal 124. Interposed between the valve body 120 and the plug 122 is a gasket 126.

As will be understood from FIG. 13, each of the high pressure fuel passages 22a is connected to a pump chamber 132 via a delivery valve 134. The pump chamber 132 is defined by a plunger barrel 128, a plunger 130 disposed therein and a valve body 136 of the delivery valve 134. The reference numeral 138 designates a spring which biases the delivery valve 134 toward the illustrated closed position. It will be noted that the high pressure fuel passage 22a extends from the delivery valve 134 to a corresponding high pressure fuel pipe 22.

The conduct means thus far described in connection with FIGS. 10 to 13 operates as follows: The plunger 130 is reciprocally movable and fuel is sucked into the pump chamber during the suction or downward stroke of the plunger 130. During its upward stroke, the plunger 130 displaces the fuel in the pump chamber 132, urging the delivery valve 134 upwardly against the bias of the spring 138 to open the fuel passage therethrough to the high pressure fuel passage 22a. The fuel flows from the high pressure fuel passage 22a to a corresponding fuel injector 20 (see FIG. 10) via a corresponding high pressure fuel pipe 22.

Figure 9:
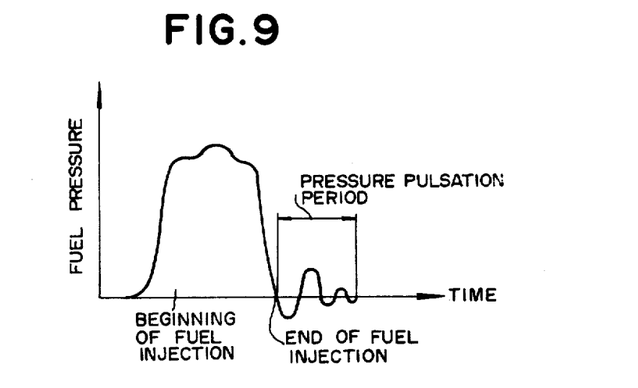
FIG. 9 is a fuel injection pressure vs. time curve.

When the plunger 130 starts to descend, the delivery valve 134 closes under the bias of the spring 138. During this stroke of the plunger 130, the delivery valve 134 is seated under the action of the delivery valve spring 138. The delivery valve 134 is equipped with a piston 134a, as shown in FIG. 13, which provides a sucking motion when the delivery valve is seated. This sucking motion causes fuel pressure in the high pressure fuel passsage 22a and fuel injection pipe 22 to decrease rapidly. As a result, fuel injection is cut off sharply and fuel leakage from the fuel injection nozzle 20 (see FIG. 10) is prevented. This drop in fuel pressure inside the fuel passage 22a is very sharp at the end of fuel injection, as shown in FIG. 9; therefore fuel pressure pulsation shown in FIG. 9 takes place after the end of fuel injection.

Referring to FIGS. 12 and 13, oil under pressure is supplied to the common passage 112 from the main gallery of the lubricant system through the oil conduct conduit 106. The pressure within the common passage 112 is set lower than the remaining pressure within the high pressure fuel passage 22a to permit the check valve 114 to close normally.

The check valve 114 which is normally closed is opened whenever the pressure pulse occurs to cause the pressure within the high pressure fuel passage 22a to momentarily drop below the pressure within the common passage 112. This pressure differential across the check valve 114 draws oil into the high pressure fuel passage 22a through the valve.

In this manner, a portion of oil within the lubricant system is fed into the fuel system at every fuel injection pulse. The oil is mixed with fuel and burned together with fuel within the combustion chambers of the engine.

If oil within the lubricant system drops as a result of oil extraction, the oil conduct means 34, 36, and 50 (see FIG. 10) is shifted to an operative state to supply oil to the lubricant system. 118' which may replace the valve element 118 of the check valve 114 is shown. This valve element 118' is equipped with a piston surface 140 which provides a sucking motion when the valve is seated. Due to the sucking motion of this piston surface, the valve closing action is sharp, decreasing the time required for the valve closing and thus decreasing the amount of oil to be fed per each valve opening. Thus, if it is desired to reduce the amount of oil to be extracted from the lubrication system, the check valve using the valve element 118' illustrated in FIG. 14 should be used.

What is claimed is:

1. In an internal combustion engine for an automotive vehicle which can operate on a fuel/oil mixture, the engine including an oil pan containing oil therein, a lubricant system which is so constructed and arranged as to use oil in the oil pan to lubricate moving parts of the engine, and a fuel system having a fuel tank, a system for automatically changing oil and disposing of used oil comprising:

oil conduct means, including an oil conduct conduit having one end communicating with a portion of the lubricant system and the other end communicating with the fuel tank, for conducting a portion of used oil flowing through the lubricant system during engine operation, including the time when the automotive vehicle is running, to the fuel tank, the portion of used oil conducted from the lubricant system being mixed with fuel within the fuel tank to form a fuel/oil mixture on which the automotive vehicle can operate;

an oil tank for storing new oil; and oil supply means responsive to the level of oil in said oil pan for supplying new oil from said oil tank to said oil pan.

2. A system as claimed in claim 1, wherein said oil conduit means includes a valve provided in said oil conduct conduit.

3. A system as claimed in claim 2, wherein said oil conduct means includes an odometer switch, a timer, a safety switch, an ignition switch and a battery, wherein said timer is on for a predtermined time duration every time said odometer switch is closed, said valve being of an electromagnetic valve electrically connected with said timer, said safety switch, said ignition switch, and said battery to receive current thereby.

4. A system as claimed in claim 1, wherein said oil supply means includes an oil supply conduit having one end communicating with said oil tank and with said oil pan, and a valve provided in said oil supply conduit.

5. A system as claimed in claim 4, wherein said oil supply means includes an ignition switch, an oil level switch, an oil pressure switch, a battery, and a timer that turns on for a predetermined time duration when both said oil level switch and said oil pressure switch are closed, and wherein said valve is an electromagnetic valve electrically connected with said timer, said ignition switch and said battery to receive current thereby.

6. A system as claimed in claim 1, including a functional engaging switch attached to the vehicle odometer, whereby said system is turned on when the vehicle has travelled a predetermined distance.

7. A system as claimed in claim 4 wherein said oil supply means includes means for detecting the oil level within said oil pan and for controlling the operation of the valve in said oil supply conduit in response to changes in said level.

8. A system as claimed in claim 1, wherein said oil conduct means includes an oil conduct conduit having one end communicating with said lubricant system, a fuel injection pump having a plurality of delivery valves and a plurality of high pressure fuel passages communicating therewith, passage means connecting at least one of said plurality of high pressure fuel passages to said oil conduct conduit, and a check valve disposed in said connecting passage means.

9. A system as claimed in claim 8, wherein said passage means communicates with each of said plurality of high pressure fuel passages.

10. A method for automatically changing and disposing of used oil in an internal combustion engine for an automotive vehicle which can operate on a fuel/oil mixture, the engine including a lubricant system, an oil pan containing oil therein, a lubricant system which is so constructed and arranged as to use oil in the oil pan to lubricate moving parts of the engine, and a fuel system having a fuel tank, said method comprising the steps of:

conducting a portion of used oil flowing through the lubricant system during engine operation, including the time when the automotive vehicle is running, to the fuel tank, the portion of used oil conducted from the lubricant system being mixed with fuel within the fuel tank to form a fuel/oil mixture on which the automotive vehicle can operate; and supplying new oil from an oil tank to said oil pan in response to changes in the oil level therein.

11. In an automotive vehicle having an internal combustion engine which can operate on a fuel/oil mixture, the engine including a fuel system with a fuel tank, an oil pan containing oil therein, and a lubricant system which is so constructed and arranged as to use oil in the oil pan to lubricate moving parts of the engine, the improvement comprising:

means defining an oil conduit having one end communicating with a portion of said lubricant system to receive oil therefrom during engine operation, including the time when the engine is running, and the other end communicating with the fuel tank;

means for allowing a selected quantity of oil to pass through said oil conduit from said lubricant system to the fuel tank in response to an operating condition of said vehicle, the selected quantity of oil being mixed with fuel within the fuel tank to form a fuel/oil mixture on which the engine can operate;

an oil tank for storing new oil;

means defining an oil supply conduit having one end communicating with said oil tank and the other end communicating with said oil pan; and means for allowing a selected quantity of new oil to pass through said oil supply conduit from said oil tank to said oil pan in response to the oil level in said oil pan.

* * * * *